(12) United States Patent
Li et al.

(10) Patent No.: US 9,972,337 B2
(45) Date of Patent: May 15, 2018

(54) ACOUSTIC ECHO CANCELLATION WITH DELAY UNCERTAINTY AND DELAY CHANGE

(71) Applicant: Cisco Technology, Inc., San Jose, CA (US)

(72) Inventors: Xilin Li, San Jose, CA (US); Wei Li, Cupertino, CA (US); Fuling Liu, San Jose, CA (US); Xinmin Yan, Hangzhou (CN)

(73) Assignee: Cisco Technology, Inc., San Jose, CA (US)

( * ) Notice: Subject to any disclaimer, the term of this patent is extended or adjusted under 35 U.S.C. 154(b) by 0 days. days.

(21) Appl. No.: 15/189,382

(22) Filed: Jun. 22, 2016

(65) Prior Publication Data

US 2017/0372722 A1 Dec. 28, 2017

(51) Int. Cl.
| | |
|---|---|
| *H04M 9/08* | (2006.01) |
| *G10L 21/0264* | (2013.01) |
| *G10L 25/06* | (2013.01) |
| *G10L 25/72* | (2013.01) |
| *G10L 21/0232* | (2013.01) |
| *G10L 21/0208* | (2013.01) |

(52) U.S. Cl.
CPC ...... *G10L 21/0264* (2013.01); *G10L 21/0232* (2013.01); *G10L 25/06* (2013.01); *G10L 25/72* (2013.01); *G10L 2021/02082* (2013.01)

(58) Field of Classification Search
CPC .......... H04M 9/082; H04M 3/002; H04B 3/23
USPC ...... 381/406.01, 406.08; 379/406.01, 406.08
See application file for complete search history.

(56) References Cited

U.S. PATENT DOCUMENTS

| | | | | |
|---|---|---|---|---|
| 4,760,596 A | * | 7/1988 | Agrawal | H04B 3/235 370/291 |
| 6,970,558 B1 | * | 11/2005 | Schmidt | H04M 9/082 379/406.01 |
| 2006/0147032 A1 | * | 7/2006 | McCree | H04M 9/082 379/406.08 |

(Continued)

OTHER PUBLICATIONS

Sondhi, "An Adaptive Echo Canceller," The Bell System Technical Journal, vol. XLVI, No. 3, Mar. 1967, pp. 497-511.

(Continued)

*Primary Examiner* — Alexander Jamal
(74) *Attorney, Agent, or Firm* — Edell, Shapiro & Finnan, LLC

(57) ABSTRACT

An echo cancellation method includes receiving an echo reference signal, receiving a microphone signal, decomposing, with a first filter bank, the echo reference signal into a series of subband echo reference signals, decomposing, with a second filter bank, the microphone signal into a series of subband microphone signals, estimating a group delay between the echo reference signal and the microphone signal using the series of subband echo reference signals and the series of subband microphone signals, estimating, using adaptive filters, acoustic echoes in the echo reference signal based at least in part on the group delay, subtracting the acoustic echoes from the series of subband microphone signals to obtain a series of acoustic echo removed subband signals, combining the series of acoustic echo removed subband signals into a single time domain echo removed signal, and sending the single time domain echo removed signal to a host operating system.

15 Claims, 5 Drawing Sheets

(56) References Cited

U.S. PATENT DOCUMENTS

2011/0176687 A1* 7/2011 Birkenes .............. H04M 9/085
                                                                                      381/66

OTHER PUBLICATIONS

Wikipedia "Gauss—Seidel method," https://en.wikipedia.org/wiki/Gauss—Seidel_method, May 2, 2016, 7 pages.
Wikipedia, "Woodbury matrix identity," https://en.wikipedia.org/wiki/Woodbury_matrix_identity, Mar. 29, 2016, 3 pages.
Stokes, et al., "Robust RLS With Round Robin Regularization Including Application to Stereo Acoustic Echo Cancellation," 2006 IEEE International Conference on Acoustics Speech and Signal Processing Proceedings (ICASSP 2006), vol. 3, May 2006, pp. III-737-III-739.
Haykin, "Adaptive Filter Theory," Third Edition, Section 5.4, Weiner-Hopf Equations, © 1996 by Prentice-Hall, Inc., Jan. 1996, pp. 203-206.
Stewart, "Matrix Algorithms, vol. 1: Basic Compositions," © 1998 by the Society for Industrial and Applied Mathematics, Jan. 1998, pp. 190-192.

* cited by examiner

ACOUSTIC ECHO CANCELLATION WITH DELAY UNCERTAINTY AND DELAY CHANGE

TECHNICAL FIELD

Embodiments described herein relate to automated echo cancellation, and particularly to a methodology to process echo in an environment having echo path delay and jitter.

BACKGROUND

Acoustic echoes exist in almost all voice communication devices. A far end speech signal is sent to a loud speaker at a near end to be played back, and inevitably, a near end microphone will pick up, more or less, the played back speech signals, i.e., acoustic echoes. Without removing these acoustic echoes, a far end user will hear her/his own voice, making efficient communication difficult. Acoustic echo cancellation (AEC) can attenuate or remove these acoustic echoes before the near end microphone signal is sent to the far end.

DESCRIPTION OF EXAMPLE EMBODIMENTS

Overview

Figure 1:
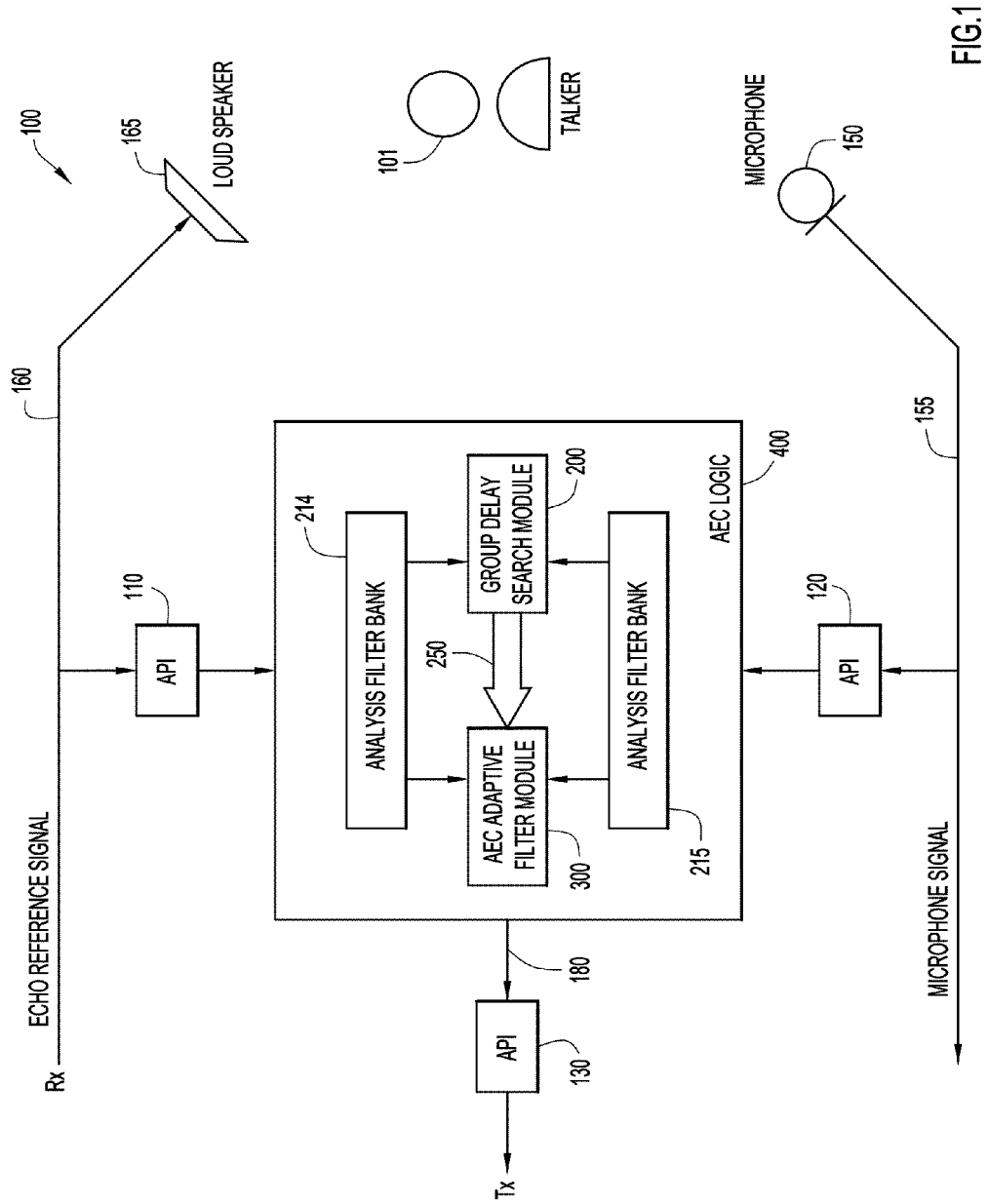
FIG. 1 depicts features of an Acoustic Echo Cancellation (AEC) system according to an example embodiment.

In one embodiment there is provided an echo cancellation method including receiving an echo reference signal, receiving a microphone signal, decomposing, with a first filter bank, the echo reference signal into a series of subband echo reference signals, decomposing, with a second filter bank, the microphone signal into a series of subband microphone signals, estimating a group delay between the echo reference signal and the microphone signal using the series of subband echo reference signals and the series of subband microphone signals, estimating, using adaptive filters, acoustic echoes in the echo reference signal based at least in part on the group delay, subtracting the acoustic echoes from the series of subband microphone signals to obtain a series of acoustic echo removed subband signals, combining, using a synthesis filter bank, the series of acoustic echo removed subband signals into a single time domain echo removed signal, and sending the single time domain echo removed signal to a host operating system.

In another embodiment there is provided an apparatus that includes a network interface unit configured to enable communications via a network, a memory configured to store logic instructions, and a processor, when executing the logic instructions, configured to receive an echo reference signal, receive a microphone signal, decompose, with a first filter bank, the echo reference signal into a series of subband echo reference signals, decompose, with a second filter bank, the microphone signal into a series of subband microphone signals, estimate a group delay between the echo reference signal and the microphone signal using the series of subband echo reference signals and the series of subband microphone signals, estimate, using adaptive filters, acoustic echoes in the echo reference signal based at least in part on the group delay, subtract the acoustic echoes from the series of subband microphone signals to obtain a series of acoustic echo removed subband signals, combine, using a synthesis filter bank, the series of acoustic echo removed subband signals into a single time domain echo removed signal, and send the single time domain echo removed signal to an endpoint device.

EXAMPLE EMBODIMENTS

Acoustic Echo Cancellation (AEC) is a well-studied topic in a classic setting where the delay between a far end echo reference signal and received echoes by a microphone is a number fixed and approximately known in advance. A typical example is an AEC system implemented on a digital signal processor (DSP), wherein the DSP accesses the echo reference signal and the microphone signal in real time, and neither delay uncertainty nor delay change is under the consideration. This greatly simplifies the design of an AEC system.

However, today, more and more AEC systems are implemented as application software running on hosting operating systems, e.g., Microsoft Windows, OS X, Android, etc. Such AEC software can only access the far end echo reference signal and the microphone signal via an application program interferences (API) provided by the hosting operating system. Unfortunately, these APIs are generally not designed for real time data transfer. Indeed, the delay uncertainty between the echo reference signal and the microphone signal introduced by these APIs is typically unknown, not fixed, and vary in a large dynamic range, e.g., up to 0-0.5 second on a typical Android device. Also, these APIs may only have access to distorted replica of the echo reference signal and (or) the microphone signal, making AEC more challenging.

Furthermore, AEC software does not necessarily have the highest priority on certain devices, making its processing time on the processor, e.g., a central processing unit (CPU), less predictable than that on a DSP. These new challenges make many existing AEC designs either perform poorly or fail completely when they are used as application software.

Reference is now made to FIG. 1, which depicts features of an Acoustic Echo Cancellation (AEC) system 100 according to an example embodiment.

AEC system 100 comprises APIs 110, 120 and 130 that enable communication with AEC logic 400. AEC logic 400 comprises, in one possible embodiment, two modules: a group delay search module 200 and a group delay compensated AEC adaptive filter module 300. Analysis filter banks 214, 215 supply appropriate signals to group delay search module 200 and AEC adaptive filter module 300.

In an embodiment, microphone 150 picks up acoustic signals from talker or user 101 and generates a microphone signal 155 that is monitored by AEC logic 400 via API 120. An echo reference signal 160, received from a far end, is supplied to a loud speaker 165. Echo reference signal 160 is monitored by AEC logic 400 via API 110. API 130 is configured to send an echo removed signal towards the far end endpoint (not shown).

In accordance with one possible implementation, group delay search module 200 searches the group delay between the echo reference signal 160 and the microphone signal 155. Typically, this delay is searched in a large range, e.g., 0-0.5 second. Due to the large delay uncertainty range, it is not possible to implement AEC adaptive filter module 300 with taps covering the whole delay uncertainty range. As shown further in FIG. 3, AEC adaptive filters of AEC adaptive filter module 300 are compensated by a calculated group delay, and accordingly, only assigns taps around the estimated group delay.

For example, with a sampling rate of 16000/sec and acoustic echo tail length of 0.1 second, when the AEC adaptive filter module 300 is implemented in the time domain, a group delay compensated AEC adaptive filter might employ only 1600 taps to cover the echo tail, while without group delay compensation, the adaptive filter might employ 9600 taps to cover both the echo tail and the delay uncertainty, which can vary from 0 second to 0.5 second. The group delay compensation not only reduces the computational load, but also speeds up convergence due to a shorter adaptive filter length. Echo tail length is the length of the impulse response of the echo system. Since the echo comes from multiple reflection paths, the echo is the sum of multiple copies of the reflected voice from the far end. Echo tail length determines how much longer the echo can be heard after the source of the echo is removed.

As mentioned, API 110 is the API that provides the echo reference signal 160 to the AEC logic 400 for group delay estimation and adaptive filtering. Unlike a DSP implementation where the AEC algorithm may have direct access to the raw echo reference signal 160 and microphone signal 155, API 110 provided by the operating system appears as a "black box" to AEC logic 400. Notably, API 110 may introduce unknown and time varying delay to the echo reference signal 160. Also, when certain sound effect features of the hosting operating system are not turned off, the echo reference signal 160 is not necessarily identical to the signal immediately sent to the loud speaker 165.

As also mentioned, API 120 feeds the microphone signal 155 to AEC logic 400 for group delay estimation and adaptive filtering. Again, AEC logic is not a priori aware of any delay or signal distortion to the microphone signal 155 that may be caused by API 120. To make matters worse, on many hosting operating systems, the microphone signal 155 may be processed by other speech processing algorithms, e.g., noise suppression, beam forming, dynamic range control, adaptive gain control, or external AEC algorithms, before arriving at AEC logic 400. Such extra processing may introduce delay uncertainty, delay change, and signal distortion. None is desirable for efficient AEC implementations.

API 130 sends an acoustic echo removed signal 180 to a transmission unit, e.g., a voice codec and a data-packaging module. In embodiments described herein, AEC logic 400 processes its received data in a real time manner so that API 130 can read the processed data in a real time manner as well, thereby avoiding undesirable data loss may.

Figure 2:
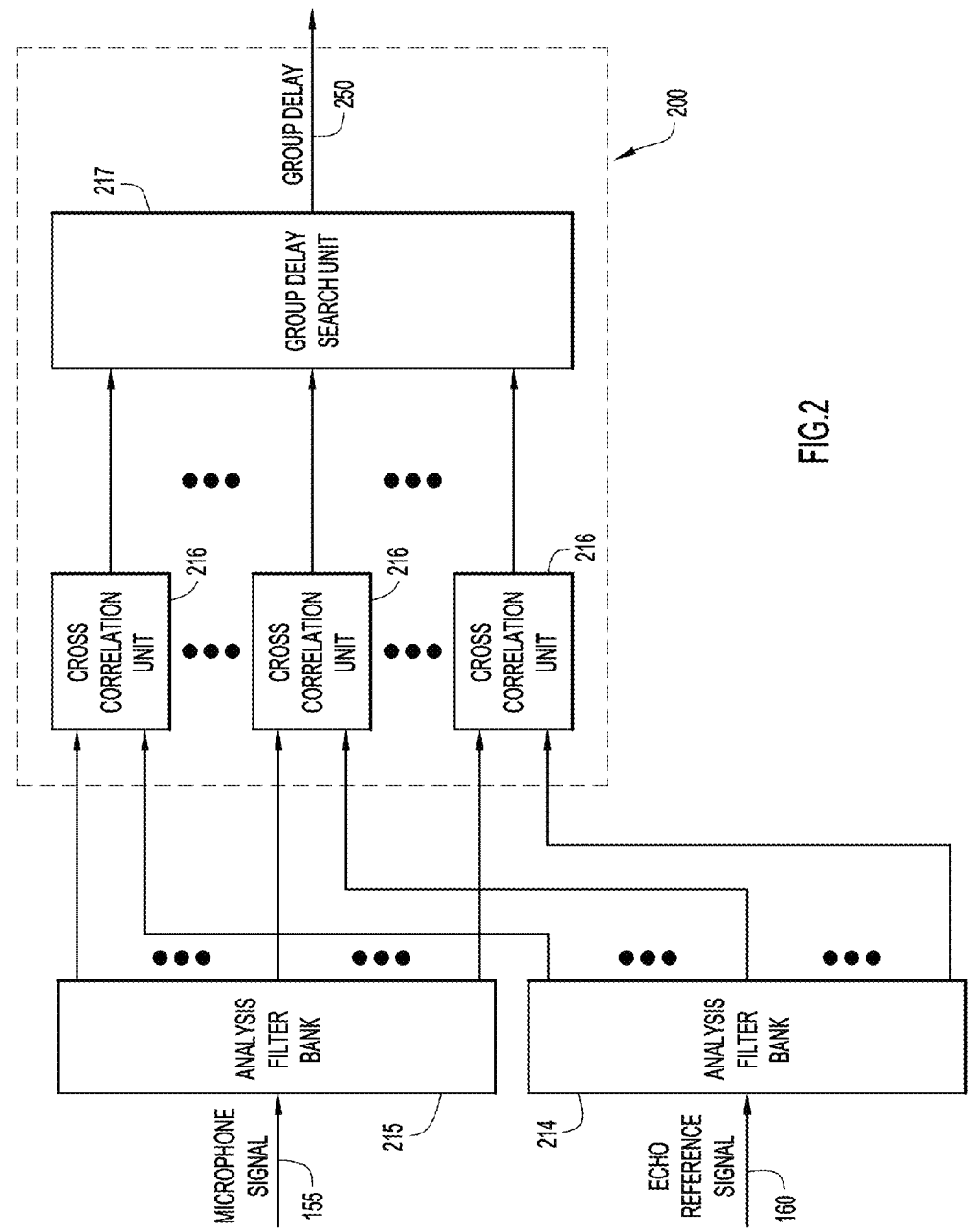
FIG. 2 shows a cross-correlated based delay search in the frequency domain using filter bank analysis according to an example embodiment.

Reference is now made to FIG. 2, which shows a cross-correlated based delay search in the frequency domain using filter bank analysis according to an example embodiment. That is, FIG. 2 depicts an implementation of group delay search module 200.

In am embodiment, analysis filter bank 214 decomposes the original time domain echo reference signal into a series of narrow banded signals with reduced sampling rate. The filter bank analysis reduces the computational load, speeds up the convergence of AEC adaptive filters, and facilitates the estimation of group delay between the echo reference signal and the microphone signal.

Latency, aliasing, and reconstruction error are the major factors considered for filter bank design. Let S(n,k) be the analysis filter bank output at the nth frame and the kth subband. Note that S(n,k) can be complex valued.

In a similar fashion, the analysis filter bank 215 decomposes the microphone signal into a series of narrow banded signals with reduced sampling rate. The analysis filter banks 214 and 215 may have identical structures and parameters so that perfect or nearly perfect synthesis is possible. Let X(n,k) be the analysis filter bank output for the microphone signal at the nth frame and the kth subband.

The cross correlation units 216 calculate the cross correlation coefficients between the echo reference signal and the microphone signal for each subband. For example, for the nth frame and the kth subband, these cross correlation coefficients can be estimated by the following moving average model, $$C^{new}(\tau,k) = \lambda C^{old}(\tau,k) + (1-\lambda)X^*(n,k)S(n-\tau,k), \tau=0,1,2,\ldots, \quad (1)$$

where $0<\lambda<1$ is a forgetting factor, and superscript * denotes conjugation of a complex valued number. Cross correlation coefficients with $\tau<0$ are not considered because in any workable AEC system, the echo reference signal always arrives the AEC module no later than the microphone signal.

For each subband, the location of the peak of the amplitudes of these cross correlation coefficients shows the delay between the echo reference signal and the microphone signal. By definition, a group delay between the echo reference signal and the microphone signal will be the average of these subband delays.

The group delay search unit 217 estimates this group delay. In one embodiment example, the delay between the echo reference signal and the microphone signal is first estimated for each subband. Let $d_k$ be the estimated delay for the kth subband. Then the group delay is determined as the mean of these subband delays, i.e., $$d_{group} = \frac{1}{(num \text{ of bands})} \sum_k d_k. \quad (2)$$

This way typically leads to fine resolution group delay estimations since $d_{group}$ can be a fractional number.

In another implementation example, instead of using the arithmetic mean, median value of these subband delays may be used as the group delay estimation. Compared with the arithmetic mean, median value may be more resistant to outliers from the subband delay estimations.

Yet in one more embodiment example, the group delay is obtained by searching for the location of the maximum average absolute cross correlation coefficients. Let $$C(\tau) = \frac{1}{(num \text{ of bands})} \sum_k w_k |C(\tau,k)|, \tau = 0, 1, 2, \ldots, \quad (3)$$

be the average absolute cross correlation coefficients, where |•| denotes absolute value of a complex valued number, and $w_k$ is a positive weight for the kth band. By choosing $$w_k = \frac{1}{\sqrt{E[|X(n,k)|^2]E[|S(n,k)|^2]}},\qquad(4)$$

the cross correlation coefficients from each subband are normalized to have approximately the same maximum amplitudes, where E denotes expectation, and in practice, it can be replaced with moving average as done in (1). The group delay can be determined by searching for the location of $C(\tau)$ where the average cross correlation amplitude achieves the maximum value.

The estimated group delay is used to align the echo reference signal and the microphone signal so that the AEC adaptive filters may only need to assign their taps around the group delay. It is also possible to use the group delay estimation to monitor the echo path change. A small group delay change may be caused by the delay estimation error, not necessarily reflecting a true physical delay change. However, a large enough delay change, e.g., larger than one frame, is most likely caused by an echo path change. When an echo path change is detected, resetting the AEC adaptive filter coefficients to zeros may speed up the re-convergence of the AEC adaptive filters.

Figure 3:
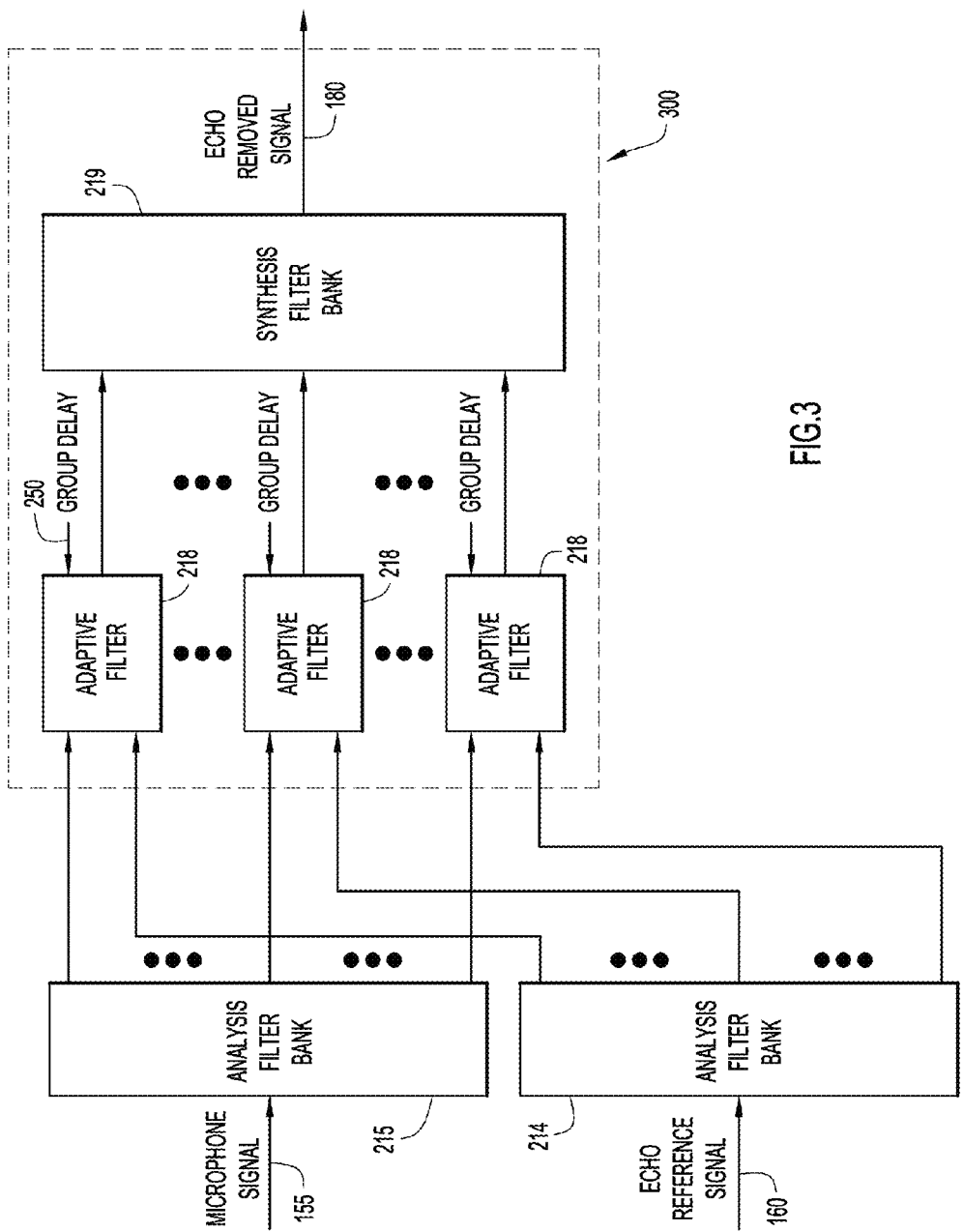
FIG. 3 shows group delay compensated AEC adaptive filters implemented in the frequency domain using filter banks analysis and synthesis according to an example embodiment.

FIG. 3 shows group delay compensated AEC adaptive filters implemented in the frequency domain using filter banks analysis and synthesis according to an example embodiment.

The adaptive filters 218 remove the acoustic echoes by adaptively adjusting their filter coefficients to reproduce or estimate the acoustic echoes, and subtract them from the microphone signal. Here, the group delay is used to guide the adaptive filters to assign their tap coefficients around the estimated group delay. For example, the adaptive filter taps may cover delay range $$[d_{group}-L_{tail},\ldots,d_{group}-1,d_{group},d_{group}+1,\ldots,d_{group}+L_{lead}],\qquad(5)$$

where $L_{tail} \geq L_{lead} \geq 0$. It is proposed to choose $L_{lead} \geq 1$ since the group delay estimation can only be accurate to one frame, and delays for certain subbands may be smaller than the estimated group delay.

After determining the covered delay range of the AEC adaptive filters, these adaptive filter coefficients are trained by minimizing the energy of the filter outputs in each subband.

In one implementation example, stochastic gradient descent algorithms, e.g., the normalized least mean squares (NLMS) adaptive filters, or affine projection (AP) adaptive filters, are used to learn the adaptive filter coefficients. Stochastic gradient descent algorithms typically converge slowly, especially when the echo path changes, an event not uncommon in the instant embodiments. To accelerate their convergence in the presence of a delay change, the adaptive filter coefficients are reset to zeros when a group delay change is detected. Here, a group delay change is detected when the absolute difference between the current group delay and the last group delay is larger than a threshold, e.g., one frame.

In another implementation example, fast least squares adaptive filters are used to learn the adaptive filter coefficients. For each subband, its optimal filter coefficients are solved by directly solving the Wiener-Hopf equations $$R(n,k)W(n,k)=C(n,k)\qquad(6)$$

using fast and numerically stable linear system solvers, where $R(n,k)$ is the estimated autocorrelation matrix of the echo reference signal (or series of autocorrelation matrices), $W(n,k)$ is the optimal filter coefficients in the least squares sense, and $C(n,k)$ is the delay aligned cross correlation coefficients between the echo reference signal and the microphone signal.

One implementation example of the least squares adaptive filters is to solve the Wiener-Hopf equations (6) using Cholesky decomposition. The Cholesky factor can be recursively updated using rank-1 Cholesky update. To ensure numerical stability, the diagonal elements of the Cholesky factor are forced to be no smaller than a threshold. Then forward and backward substitutions are used to solve the resultant linear system.

In another implementation example of the least squares adaptive filters, a line search method is used to solve for the optimal adaptive filter coefficients. An error vector is defined as $$e(n,k)=R(n,k)W(n-1,k)-C(n,k).\qquad(7)$$

The new adaptive filter coefficients are updated in the direction of error vector with an optimal step size minimizing the fitting error of the Wiener-Hopf equations or the energy of the filter output.

Both the Cholesky decomposition method and the line search method are able to deliver performance comparable to that of the theoretically optimal Wiener solution, and at the same time, have the same order of computational complexity as that of the recursive least squares (RLS) method. Unlike the RLS method, which may suffer from numerical difficulties whenever the autocorrelation matrix is close to singular, the Cholesky decomposition method and the line search method tend to be numerically stable.

The synthesis filter bank 219 combines the echo-removed subband signals into a single time domain signal. The synthesis filter bank 219 can be any polyphase filter bank, as long as it is paired with the analysis filter bank such that the analysis-synthesis procedure introduces acceptable latency and signal distortions to the microphone signal 155 when the AEC adaptive filter coefficients are zeros.

The forgetting factor $\lambda$ used in Equation (1) controls how fast the AEC adapts to the change of the impulse response of the echo path. The smaller the), the more aggressive (and faster) the filter adapts to the echo path; the larger the A, the more conservative (and slower) the filter reacts to the change of the echo path. An aggressive filter converges fast at the cost of being potentially unstable while a conservative is slow in tracking the change of the echo path but it is always stable.

One implementation of the embodiments described herein uses two instances of AEC logic 400, each with a different forgetting factor $\lambda$. The first instance of AEC logic 400, called filter0, uses a smaller forgetting factor $\lambda 0$ to aggressively adapt to the change of the echo path. The second instance of AEC logic, called filter1, uses a larger forgetting factor $\lambda 1$ to adapt slowly to the change of the echo path.

These two filters can be configured to run simultaneously. Let $Y(n,k)$ be the filter output The microphone input power, pwx, is computed by $$pwx=X(n,k)*X*(n,k)\qquad(8)$$

The filter output power pw0 for filter0 and the filter output power pw1 for filter1 are computed by $$pw0=Y0(n,k)*Y0*(n,k)\qquad(9)$$

and $$pw1=Y1(n,*Y1*(n,k)\qquad(10)$$

where Y0*(n,k) is the complex conjugate of Y0(n,k), and Y1*(n,k) is the complex conjugate of Y1(n,k).

The values of pwx, pw0 and pw1 are compared. If pwx is the smallest, we bypass both filters and send the microphone input data out for the output of adaptive filters 218. If pw0 is the smallest, filter0 is implemented for adaptive filters 218. If pw1 is the smallest, filter1 is implemented for adaptive filters 218.

The output of adaptive filters 218 from all subbands are then synthesized and transformed back to the discrete time domain in synthesis filter bank 219.

Figure 4:
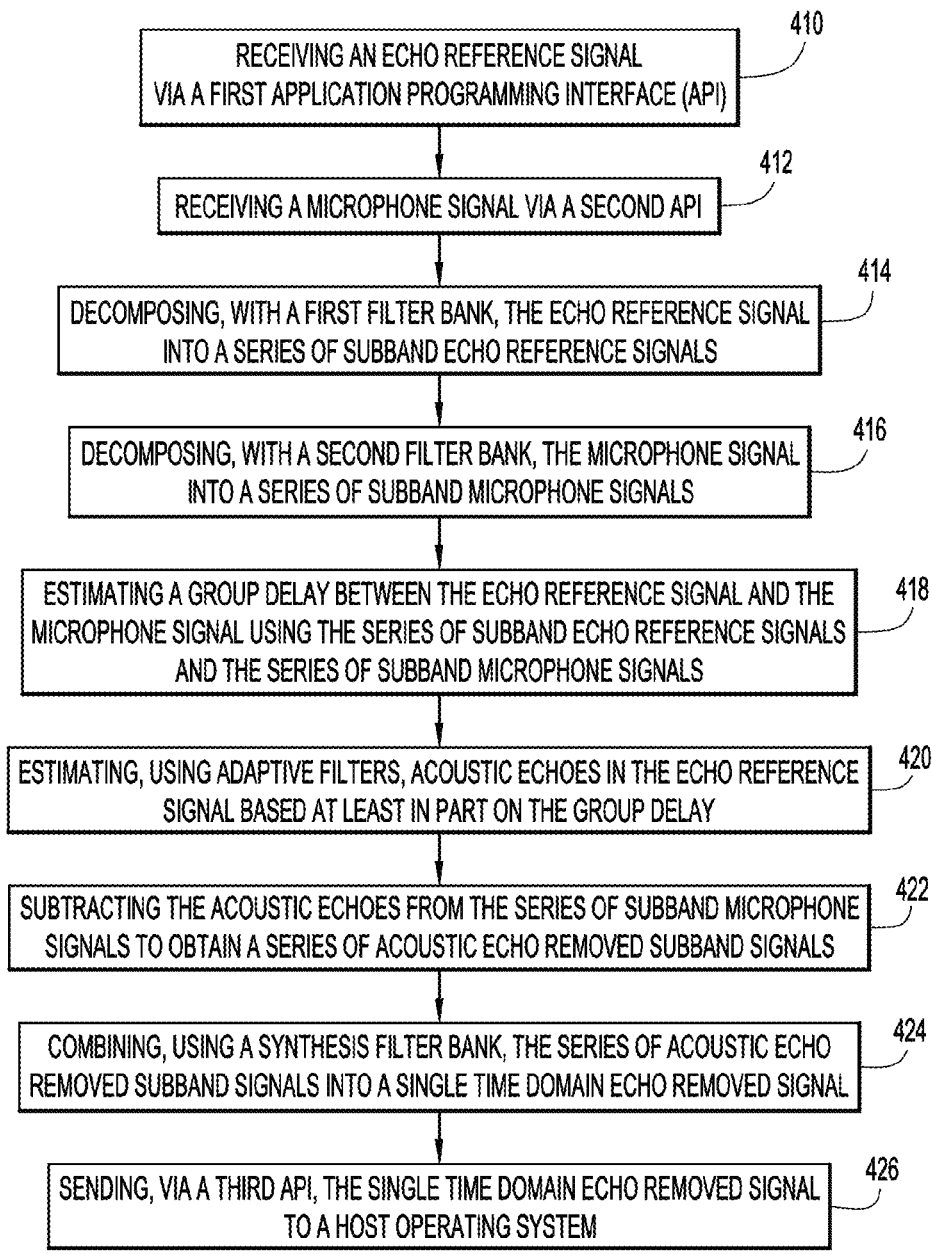
FIG. 4 depicts a flowchart showing a series of operations in accordance with an example embodiment.

FIG. 4 depicts a flowchart showing a series of operations in accordance with an embodiment. The operations include, at 410, receiving an echo reference signal via a first application programming interface (API) and at 412 receiving a microphone signal via a second API. At 414, there is an operation of decomposing, with a first filter bank, the echo reference signal into a series of subband echo reference signals, and at 416 there is an operation decomposing, with a second filter bank, the microphone signal into a series of subband microphone signals. The depicted method then includes, at 418, estimating a group delay between the echo reference signal and the microphone signal using the series of subband echo reference signals and the series of subband microphone signals, and, at 420, estimating, using adaptive filters, acoustic echoes in the echo reference signal based at least in part on the group delay. At 422, there is an operation of subtracting the acoustic echoes from the series of subband microphone signals to obtain a series of acoustic echo removed subband signals. At 424, the methodology includes combining, using a synthesis filter bank, the series of acoustic echo removed subband signals into a single time domain echo removed signal, and, at 426, sending, via a third API, the single time domain echo removed signal to a host operating system. It is noted that there may be two instances of AEC logic 400 operating simultaneously, and thus the operations described above would be performed for such instance.

Figure 5:
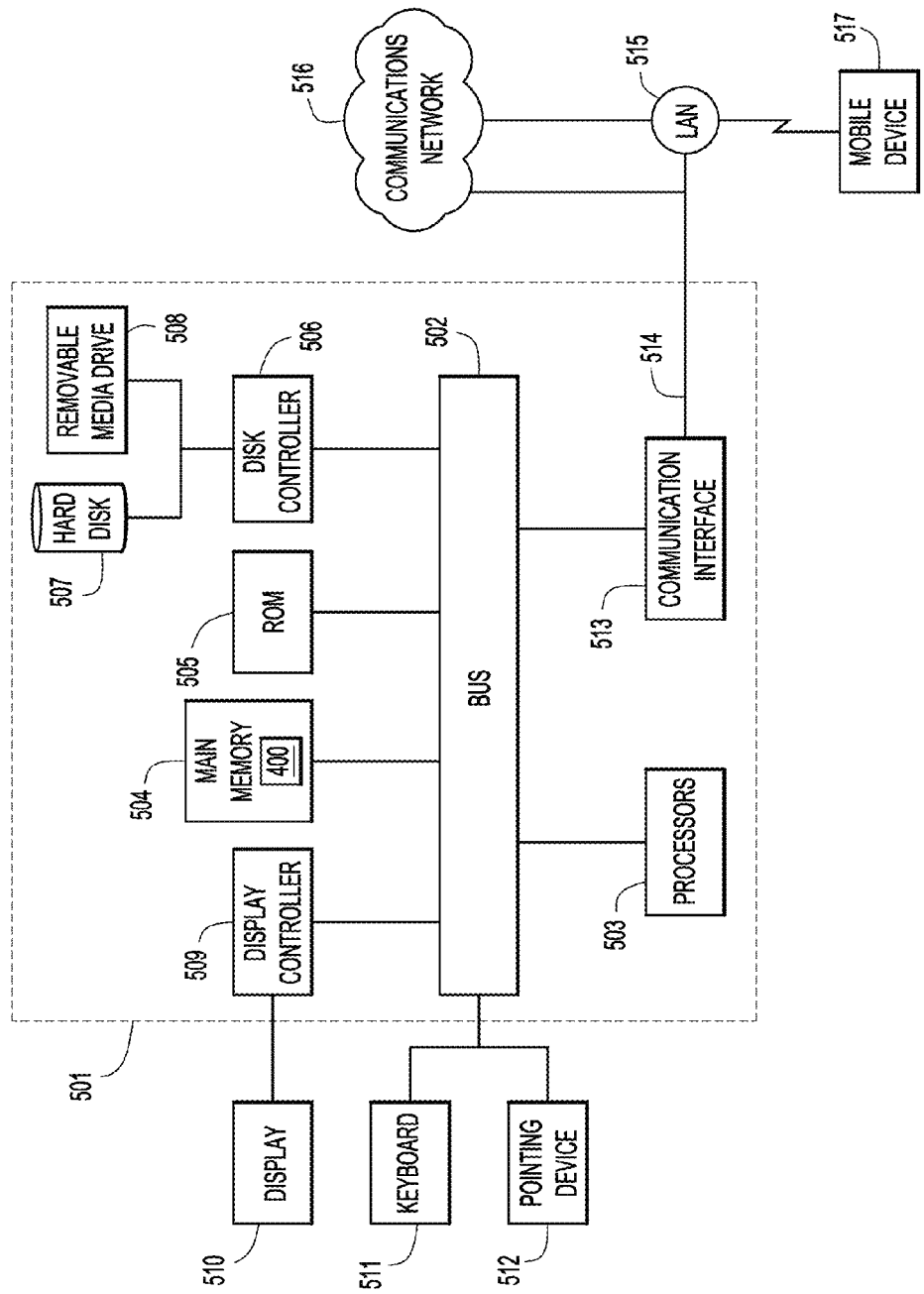
FIG. 5 depicts an apparatus that is configured to host or operate as an AEC system implementation according to an example embodiment.

FIG. 5 depicts an apparatus that is configured to host or operate as an AEC system implementation according to an example embodiment. The apparatus may be implemented on a computer system 501. The computer system 501 may be programmed to implement a computer based device. The computer system 501 includes a bus 502 or other communication mechanism for communicating information, and a processor 503 coupled with the bus 502 for processing the information. While the figure shows a signal block 503 for a processor, it should be understood that the processors 503 represent a plurality of processors or processing cores, each of which can perform separate processing. The computer system 501 may also include a main memory 504, such as a random access memory (RAM) or other dynamic storage device (e.g., dynamic RAM (DRAM), static RAM (SRAM), and synchronous DRAM (SD RAM)), coupled to the bus 502 for storing information and instructions to be executed by processor 503. In addition, the main memory 504 may be used for storing temporary variables or other intermediate information during the execution of instructions by the processor 503. Main memory may also be used to store logic instructions or software for performing operations associated with AEC logic 400 depicted in FIGS. 1-4.

The computer system 501 may further include a read only memory (ROM) 505 or other static storage device (e.g., programmable ROM (PROM), erasable PROM (EPROM), and electrically erasable PROM (EEPROM)) coupled to the bus 502 for storing static information and instructions for the processor 503.

The computer system 501 may also include a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, compact disc jukebox, tape drive, and removable magneto-optical drive). The storage devices may be added to the computer system 501 using an appropriate device interface (e.g., small computer system interface (SCSI), integrated device electronics (IDE), enhanced-IDE (E-IDE), direct memory access (DMA), or ultra-DMA).

The computer system 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 501 may also include a display controller 509 coupled to the bus 502 to control a display 510, such as a cathode ray tube (CRT) or liquid crystal display (LCD), for displaying information to a computer user. The computer system 501 may include input devices, such as a keyboard 511 and a pointing device 512, for interacting with a computer user and providing information to the processor 503. The pointing device 512, for example, may be a mouse, a trackball, or a pointing stick for communicating direction information and command selections to the processor 503 and for controlling cursor movement on the display 510. In addition, a printer may provide printed listings of data stored and/or generated by the computer system 501.

The computer system 501 performs a portion or all of the processing operations of the embodiments described herein in response to the processor 503 executing one or more sequences of one or more instructions contained in a memory, such as the main memory 504. Such instructions may be read into the main memory 504 from another computer readable medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 501 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 501, for driving a device or devices for implementing the described embodiments, and for enabling the computer system 501 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 501 also includes a communication interface 513 coupled to the bus 502. The communication interface 513 provides a two-way data communication coupling to a network link 514 that is connected to, for example, a local area network (LAN) 515, or to another communications network 516, such as the Internet 140 in FIG. 1. For example, the communication interface 513 may be a wired or wireless network interface card to attach to any packet switched (wired or wireless) LAN. As another example, the communication interface 513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local are network 515 (e.g., a LAN) or through equipment operated by a service provider, which provides communication services through a communications network 516. The local network 514 and the communications network 516 use, for example, electrical, electromagnetic, or optical signals that carry digital data streams, and the associated physical layer (e.g., CAT 5 cable, coaxial cable, optical fiber, etc.). The signals through the various networks and the signals on the network link 514 and through the communication interface 513, which carry the digital data to and from the computer system 501 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 501 can transmit and receive data, including program code, through the network(s) 515 and 516, the network link 514 and the communication interface 513. Moreover, the network link 514 may provide a connection through a LAN 515 to a mobile device 517 such as a personal digital assistant (PDA) laptop computer, or cellular telephone.

In sum, there is provided an AEC methodology and corresponding apparatus that includes a group delay search module and an adaptive group delay compensated AEC module. The delay search module tracks the group delay between a echo reference signal and a microphone signal by checking the cross correlation coefficients between these two signals. To save computational load, the AEC adaptive filters only assign tap coefficients around this estimated group delay, i.e., a group delay compensated AEC. Stochastic gradient descent and least squares adaptive filters can be used for adaptation of AEC filters. With sufficient computational resources, these AEC adaptive filter coefficients can be directly calculated by solving the Wiener-Hopf equations using computationally efficient and numerically stable linear system solvers. This considerably accelerates the convergence of the AEC adaptive filters in the presence of delay change, an event not uncommon when the AEC system can only accesses the echo reference signal and microphone signal via APIs provided by a hosting operating system.

In one form, a method is provided comprising: receiving an echo reference signal; receiving a microphone signal; decomposing, with a first filter bank, the echo reference signal into a series of subband echo reference signals; decomposing, with a second filter bank, the microphone signal into a series of subband microphone signals; estimating a group delay between the echo reference signal and the microphone signal using the series of subband echo reference signals and the series of subband microphone signals; estimating, using adaptive filters, acoustic echoes in the echo reference signal based at least in part on the group delay; subtracting the acoustic echoes from the series of subband microphone signals to obtain a series of acoustic echo removed subband signals; combining, using a synthesis filter bank, the series of acoustic echo removed subband signals into a single time domain echo removed signal; and sending the single time domain echo removed signal to a host operating system.

In another form, an apparatus is provided comprising: a network interface unit configured to enable communications via a network; a memory configured to store logic instructions; and a processor, when executing the logic instructions, configured to: receive an echo reference signal; receive a microphone signal; decompose, with a first filter bank, the echo reference signal into a series of subband echo reference signals; decompose, with a second filter bank, the microphone signal into a series of subband microphone signals; estimate a group delay between the echo reference signal and the microphone signal using the series of subband echo reference signals and the series of subband microphone signals; estimate, using adaptive filters, acoustic echoes in the echo reference signal based at least in part on the group delay; subtract the acoustic echoes from the series of subband microphone signals to obtain a series of acoustic echo removed subband signals; combine, using a synthesis filter bank, the series of acoustic echo removed subband signals into a single time domain echo removed signal; and send the single time domain echo removed signal to an endpoint device.

In still another form, a non-transitory processor readable medium encoded with instructions that, when executed by a processor, cause the processor to: receive an echo reference signal; receive a microphone signal; decompose, with a first filter bank, the echo reference signal into a series of subband echo reference signals; decompose, with a second filter bank, the microphone signal into a series of subband microphone signals; estimate a group delay between the echo reference signal and the microphone signal using the series of subband echo reference signals and the series of subband microphone signals; estimate, using adaptive filters, acoustic echoes in the echo reference signal based at least in part on the group delay; subtract the acoustic echoes from the series of subband microphone signals to obtain a series of acoustic echo removed subband signals; combine, using a synthesis filter bank, the series of acoustic echo removed subband signals into a single time domain echo removed signal; and send the single time domain echo removed signal to an endpoint device.

The above description is intended by way of example only. Various modifications and structural changes may be made therein without departing from the scope of the concepts described herein and within the scope and range of equivalents of the claims.

What is claimed is:

1. A method comprising:
receiving an echo reference signal;
receiving a microphone signal;
decomposing, with a first filter bank, the echo reference signal into a series of subband echo reference signals;
decomposing, with a second filter bank, the microphone signal into a series of subband microphone signals;
estimating a group delay between the echo reference signal and the microphone signal using the series of subband echo reference signals and the series of subband microphone signals;
estimating, using adaptive filters, acoustic echoes in the echo reference signal based at least in part on the group delay;
subtracting the acoustic echoes from the series of subband microphone signals to obtain a series of acoustic echo removed subband signals;
combining, using a synthesis filter bank, the series of acoustic echo removed subband signals into a single time domain echo removed signal; and
sending the single time domain echo removed signal to an endpoint device,
wherein estimating the group delay comprises calculating cross correlation coefficients between the series of subband echo reference signals and the series of subband microphone signals for each subband, and
further comprising:
calculating an inverse of a square root of a product of powers of the series of subband echo reference signals and the series of subband microphone signals as a weight for each subband;
calculating a sum of weighted absolute cross correlation coefficients using the weight for each subband; and
estimating the group delay by searching for a location of a maximum value of the sum of the weighted absolute cross correlation coefficients.

2. The method of claim 1, further comprising operating the first filter bank, the second filter bank and the synthesis filter bank as at least one of a discrete Fourier transform (DFT) filter bank or a discrete cosine modulated filter bank.

3. The method of claim 1, further comprising:
calculating a subband delay by searching for a location of a cross correlation coefficient having a maximum absolute value; and
selecting the arithmetical mean or the median value of all subband delays as a group delay estimation.

4. The method of claim 1, further comprising:
the adaptive filters aligning the series of subband echo reference signals and the series of subband microphone signals using the group delay for each subband.

5. The method of claim 4, further comprising operating the adaptive filters as at least one of a series of least mean squares (LMS) adaptive filters or normalized LMS (NLMS) adaptive filters.

6. The method of claim 4, further comprising:
estimating autocorrelation matrices of the series of subband echo reference signals for each subband using a series of autocorrelation matrix estimates,
wherein the adaptive filters operate as a series of least squares adaptive filters implemented via directly solving the Wiener-Hopf equations.

7. The method of claim 6, wherein the adaptive filters operate as a series of least squares adaptive filters implemented via directly solving the Wiener-Hopf equations using linear system solvers, the method further comprising:
employing a Cholesky decomposition based linear system solver;
decomposing the autocorrelation matrices using Cholesky factorization;
forcing diagonal elements of the Cholesky factor to be no smaller than a positive threshold; and
solving for the adaptive filter coefficients using backward and forward substitutions.

8. The method of claim 6, wherein the adaptive filters operate as a series of least squares adaptive filters implemented via directly solving the Wiener-Hopf equations using a line search linear system solver, the method further comprising:
calculating an error vector using last frame adaptive filter coefficients;
calculating an optimal step size for updating the last frame adaptive filter coefficients; and
updating the last frame adaptive filter coefficients along the error vector direction with the optimal step size to obtain current adaptive filter coefficients.

9. The method of claim 1, wherein each of the operations of estimating a group delay between the echo reference signal and the microphone signal using the series of subband echo reference signals and the series of subband microphone signals and estimating, using adaptive filters, acoustic echoes in the echo reference signal based at least in part on the group delay, are performed by a first process and a second process,
wherein the first process tracks an echo path relatively aggressively by use of a relatively smaller forgetting factor $\lambda 0$, and
wherein the second process tracks the echo path relatively conservatively by use of a relatively larger forgetting factor $\lambda 1$,
wherein the forgetting factors $\lambda 0$ and $\lambda 1$ are values that control a speed at which a reaction is made to a change of an impulse response of the echo path.

10. An apparatus comprising:
a network interface unit configured to enable communications via a network;
a memory configured to store logic instructions; and
a processor, when executing the logic instructions, configured to:
receive an echo reference signal;
receive a microphone signal;
decompose, with a first filter bank, the echo reference signal into a series of subband echo reference signals;
decompose, with a second filter bank, the microphone signal into a series of subband microphone signals;
estimate a group delay between the echo reference signal and the microphone signal using the series of subband echo reference signals and the series of subband microphone signals;

estimate, using adaptive filters, acoustic echoes in the echo reference signal based at least in part on the group delay;

subtract the acoustic echoes from the series of subband microphone signals to obtain a series of acoustic echo removed subband signals;

combine, using a synthesis filter bank, the series of acoustic echo removed subband signals into a single time domain echo removed signal; and send the single time domain echo removed signal to an endpoint device, wherein the processor, when executing the logic instructions, is further configured to:

estimate the group delay by calculating cross correlation coefficients between the series of subband echo reference signals and the series of subband microphone signals for each subband;

calculate the inverse of the square root of the product of the powers of series of subband echo reference signals and series of subband microphone signals as the weight for each subband;

calculate a sum of the weighted absolute cross correlation coefficients; and estimate the group delay by searching for the location of the maximum value of the sum of the weighted absolute cross correlation coefficients.

11. The apparatus of claim 10, wherein the processor, when executing the logic instructions, is further configured to:

operate the first filter bank, the second filter bank and the synthesis filter bank as at least one of a discrete Fourier transform (DFT) filter bank or a discrete cosine modulated filter bank.

12. The apparatus of claim 10, wherein the processor, when executing the logic instructions, is further configured to:

calculate a subband delay by searching for a location of a cross correlation coefficient having a maximum absolute value; and select the arithmetical mean or the median value of all subband delays as a group delay estimation.

13. The apparatus of claim 10, wherein the processor, when executing the logic instructions, is further configured to:

align the series of subband echo reference signals and the series of subband microphone signals using the group delay for each subband.

14. A non-transitory processor readable medium encoded with instructions that, when executed by a processor, cause the processor to:

receive an echo reference signal;

receive a microphone signal;

decompose, with a first filter bank, the echo reference signal into a series of subband echo reference signals;

decompose, with a second filter bank, the microphone signal into a series of subband microphone signals;

estimate a group delay between the echo reference signal and the microphone signal using the series of subband echo reference signals and the series of subband microphone signals;

estimate, using adaptive filters, acoustic echoes in the echo reference signal based at least in part on the group delay;

subtract the acoustic echoes from the series of subband microphone signals to obtain a series of acoustic echo removed subband signals;

combine, using a synthesis filter bank, the series of acoustic echo removed subband signals into a single time domain echo removed signal; and send the single time domain echo removed signal to an endpoint device, wherein the instruction when executed further case the processor to:

estimate the group delay by calculating cross correlation coefficients between the series of subband echo reference signals and the series of subband microphone signals for each subband, calculate the inverse of the square root of the product of the powers of series of subband echo reference signals and series of subband microphone signals as the weight for each subband;

calculate a sum of the weighted absolute cross correlation coefficients; and estimate the group delay by searching for the location of the maximum value of the sum of the weighted absolute cross correlation coefficients.

15. The processor readable medium of claim 14, further comprising instructions that, when executed by the processor, cause the processor to:

operate the first filter bank, the second filter bank and the synthesis filter bank as at least one of a discrete Fourier transform (DFT) filter bank or a discrete cosine modulated filter bank.

* * * * *